A. JONES.
Improvement in Potato-Baking Pans.
No. 114,444.                    Patented May 2, 1871.
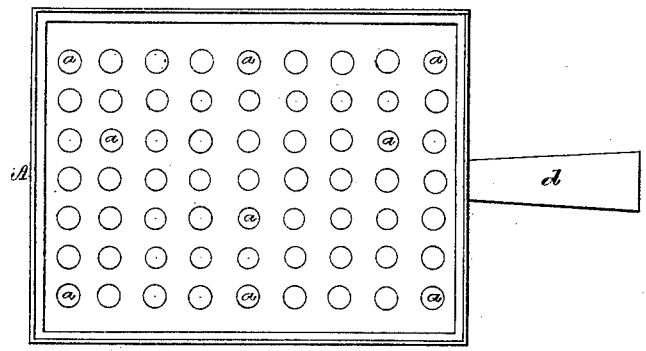
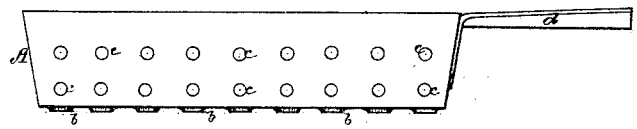
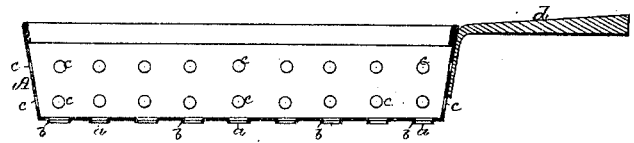
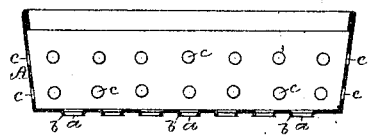
Witnesses.                      Amos Jones.
                                by his attorney,

United States Patent Office.

AMOS JONES, OF LEBANON, NEW HAMPSHIRE.

Letters Patent No. 114,444, dated May 2, 1871.

IMPROVEMENT IN POTATO-BAKING PANS.

The Schedule referred to in these Letters Patent and making part of the same.

*To all persons to whom these presents may come:*

Be it known that I, AMOS JONES, of Lebanon, of the county of Grafton and State of New Hampshire, have invented a Potato-Baking Pan; and do hereby declare the same to be fully described in the following specification and represented in the accompanying drawing, of which—

Figure 1 is a top view;
Figure 2, a side elevation;
Figure 3, a longitudinal section; and
Figure 4, a transverse section of it.

It consists of a rectangular pan, A, made of metal, and having in its bottom numerous holes, $a\ a$, each provided with a projecting lip, $b$, to extend around it and from the bottom of the pan.

I provide each end and such side with numerous holes or perforations, as represented at $c$, without any such lips, and to one end of the pan I fix a handle, $d$.

The perforations in the ends and sides require no circumscribing lips, which if used would be a disadvantage.

When the pan is made of sheet-iron the encompassing lip of each bottom hole may be produced by punching the hole from the inner surface of the bottom, so as to cause the lip to protrude from the lower surface of the said bottom.

The pan, as constructed with the perforations on its bottom and a projecting lip to each, as described, will, when supplied with potatoes and introduced into a heated oven, cause them to bake not only quicker, but to better advantage or evener than a pan without any such perforations or lips, or with perforations without lips, for the lips raise the pan off the bottom of the oven and form air-channels or spaces between the bottom of the pan and the oven, and thereby prevent the potatoes from being burned, and equalize the baking of them. Furthermore, the holes allow the heat of the bottom of the oven to ascend out the pan and, with the channel below, cause it to circulate evenly through the pan.

I am aware that pans and strainers have been made with holes in their bottoms without lips, as described, and therefore I make no claim to such.

I also am aware of the bake-pans described and shown in the patent No. 33,444, dated October 8, 1861, and granted to B. F. Miller, and consequently make no claim thereto, as my invention or pan, although having, like some of those of Miller, holes in its sides and bottom, has no legs like his, and is not intended to have any, as such would prevent it from operating as does my pan, wherein there is a circumscribing lip to each of the bottom holes, such lip being to extend from the bottom downward and rest on the floor of an oven when the pan may be used therein, the lip serving as a conductor of heat and the several lips operating to evenly diffuse the heat over the bottom so as to prevent the potatoes from baking unevenly or being burned.

What I claim as an improved manufacture is—

The potato-baking pan made as described, viz., with perforations in its bottom ends and sides, and circumscribing lips to the bottom perforations, to extend from the lower surface of such bottom, all being arranged as specified.

AMOS JONES.

Witnesses:
J. L. SPRING,
SOLON A. PECK.